(12) United States Patent
Liffick

(10) Patent No.: US 6,430,289 B1
(45) Date of Patent: Aug. 6, 2002

(54) SYSTEM AND METHOD FOR COMPUTERIZED STATUS MONITOR AND USE IN A TELEPHONE NETWORK

(75) Inventor: Stephen Mitchell Liffick, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/291,693

(22) Filed: Apr. 13, 1999

(51) Int. Cl.[7] ............................................... H04M 1/00
(52) U.S. Cl. .................... 379/900; 379/142.15; 370/352
(58) Field of Search .................. 379/201.06, 209.07, 379/201.08, 201.1, 210.11, 142.15, 196, 197, 198, 199, 900; 370/352, 353, 354

(56) References Cited

U.S. PATENT DOCUMENTS

| | | | | |
|---|---|---|---|---|
| 5,533,102 A | * | 7/1996 | Robinson et al. | 379/142 |
| 5,946,381 A | * | 8/1999 | Danne et al. | 379/142 |
| 6,175,619 B1 | * | 1/2001 | De Simone | 379/93.21 |
| 6,169,796 B1 | * | 2/2001 | Bauer et al. | 379/212 X |
| 6,229,883 B1 | * | 5/2001 | Kakizaki et al. | 379/93.23 |

* cited by examiner

Primary Examiner—Craighton Smith
(74) Attorney, Agent, or Firm—Workman, Nydegger, Seeley

(57) ABSTRACT

A telecommunication system combines telephone technology and computer. network technology to monitor a caller and callee's computer activity and to access call processing criteria selected by the caller and callee and stored on the computer network. A component of the telephone system, such as a central office switch, accesses the caller and callee call processing criteria. The system evaluates the call processing criteria and, when conditions for both caller and callee are met, the telephone system initiates a telephone call between the caller and callee. The call processing criteria may include accepting all calls, no calls, or calls only from specified parties. In addition, the call processing criteria can vary in accordance with the time of day or an individual's personal preferences, or status, such as when an individual is in a meeting. A user's computer activity may also be monitored and the computer status as idle or active may be reported to the computer network as part of the call processing criteria.

20 Claims, 10 Drawing Sheets

| | |
|---|---|
| Name | Bob Smith |
| Subscriber Name | bobxyz@msn.com |
| Phone 1 | (425) 555-1234 |
| Phone 2 | (425) 555-1235 |

⋮

| | |
|---|---|
| Name | Jim Smith |
| Subscriber Name | NONE |
| Phone 1 | (206) 555-1236 |

⌒ 166

⋮

| | |
|---|---|
| Name | John Adams |
| Subscriber Name | johnxyz@aol.com |
| Email Alias | atom smasher xyz |
| Phone 1 | (703) 555-1237 |
| Phone 2 | (703) 555-1238 |
| Phone 3 | (703) 555-1239 |

*Fig. 6*

| | |
|---|---|
| Name | Bob Smith |
| Subscriber Name | bobxyz@msn.com |
| Phone 1 | (425) 555-1234 |
| Phone 2 | (425) 555-1235 |
| Status | Allowed |

...

| | |
|---|---|
| Name | Jim Smith |
| Subscriber Name | NONE |
| Phone 1 | (206) 555-1236 |
| Status | Blocked |

...

| | | |
|---|---|---|
| Name | | Jim Smith |
| Name | | John Adams |
| Subscriber Name | | johnxyz@aol.com |
| Email Alias | | atom smasher xyz |
| Phone 1 | | (703) 555-1237 |
| Phone 2 | | (703) 555-1238 |
| Phone 3 | | (703) 555-1239 |
| Status | | Conditional |
| Phone 1 | - | Allowed |
| Phone 2 | - | Allowed 9:00 a.m. - 11:30 a.m. |
| Phone 3 | - | Blocked |

*Fig. 7*

SYSTEM AND METHOD FOR COMPUTERIZED STATUS MONITOR AND USE IN A TELEPHONE NETWORK

TECHNICAL FIELD

The present invention is directed generally to telecommunications and, more particularly, to a system and method for establishing a telephone communication link using status reporting information from an independent computer network.

BACKGROUND OF THE INVENTION

Telephone communication systems have increased in both size and complexity. Early telephone systems required a human operator to manually connect an originating telephone with a destination telephone. With the introduction of automatic switching technology, the need for human operators to connect each and every call disappeared. However, even automated switches did not provide the wide range of features available on most telephone systems, such as voicemail, caller identification, call waiting, call forwarding, three-way calling and the like. Most telephone systems today include these features and allow the customer to select one or more features to customize their telephone service. With features such as voicemail, the telephone switching system must recognize when the destination telephone is either busy or remains unanswered. If either of these conditions occur, the calling party is routed to the voicemail service associated with the destination telephone.

Despite these improvements, telephone systems are incapable of determining when a particular recipient (i.e., a callee) may be available to receive a call. The caller has no choice but to place a call to the destination telephone and hope that the callee answers. Alternatively, the caller may leave a voicemail indicating a specific time at which the caller will place yet another call. This is an undesirable activity since it requires multiple calls, thus utilizing telecommunication capabilities in an inefficient manner. In addition, repeated or failed attempts to actually reach the callee are a waste of human resources since the parties must often call back and forth to each other a number of times before actually reaching the desired party. Therefore, it can be appreciated that there is a significant need for a system and method that can establish a telephone communication link when both parties are available to communicate. The present invention provides this and other advantages as will be apparent from the following detailed description and accompanying figures.

SUMMARY OF THE INVENTION

A system to specify user-selectable criteria for call processing is implemented on a telephone system, such as a public switched telephone network (PSTN). The user-specified call processing criteria is stored on a network that is accessible by the user for data entry and/or editing, and is also accessible by the PSTN to determine whether call processing criteria exists for the particular caller. The Internet provides a readily available data structure for storage of the user-selectable call processing criteria. The user can establish a database stored on the Internet in association with the user's telephone number and indicating the user-selectable call processing criteria for one or more potential callers.

The caller may be identified by caller identification data, such as automatic number identification (ANI). Based on the destination telephone number and the caller identification data, the PSTN accesses the Internet and examines an affiliation list corresponding to the destination telephone number. If the caller identification data is present in the affiliation list, the call may be processed in accordance with the user-specified criteria for that particular caller.

Both the caller and callee can specify user-selectable call processing criteria. The potential callee can specify call processing criteria for all incoming calls, such as providing a list of individuals from whom the person will accept calls, a list of individuals from whom the person will not accept calls, or conditional criteria, such as accepting or blocking calls during certain times of day or during certain periods of activity, such as when the user may be otherwise occupied and unwilling to accept an incoming call. In addition, the potential callee's computer activity may be monitored and the status of the computer as idle or active may be reported to the computer network. The caller indicates a desire to establish a communication link with the callee. The computer network accesses the caller's call processing criteria and the callee's call processing criteria. The call processing criteria for both the caller and callee are analyzed and when all conditions are met, a telephone communication link is established between an originating telephone associated with the caller and a destination telephone associated with the callee.

BRIEF DESCRIPTION OF THE DRAWINGS

FIG. 6 illustrates sample data provided in the list of FIG. 5.

FIG. 7 illustrates additional sample data provided in the list of FIG. 3.

DETAILED DESCRIPTION OF THE INVENTION

Existing telephone technology does not provide the telephone subscriber with a technique for controlling access to the user's telephone. Features such as caller ID identify the caller, but do not control access to the user's telephone. Thus, the conventional telephone system forwards the user to extreme options. The user may answer all incoming calls or may choose not to answer any incoming calls. However, the present invention provides selective options in between these two extremes. The present invention combines telephone technology with Internet technology to allow the user to "filter" incoming calls based on user-selected criteria. In particular, the user may establish a series of lists, stored on the Internet in association with the user's telephone, to filter incoming calls and thereby control access to the user's telephone. In addition, it is possible to monitor the activity or status of both a caller and a callee and establish a communication link between the caller's telephone and the callee's telephone when status data indicates that both are available for a telephone call.

Figure 1:
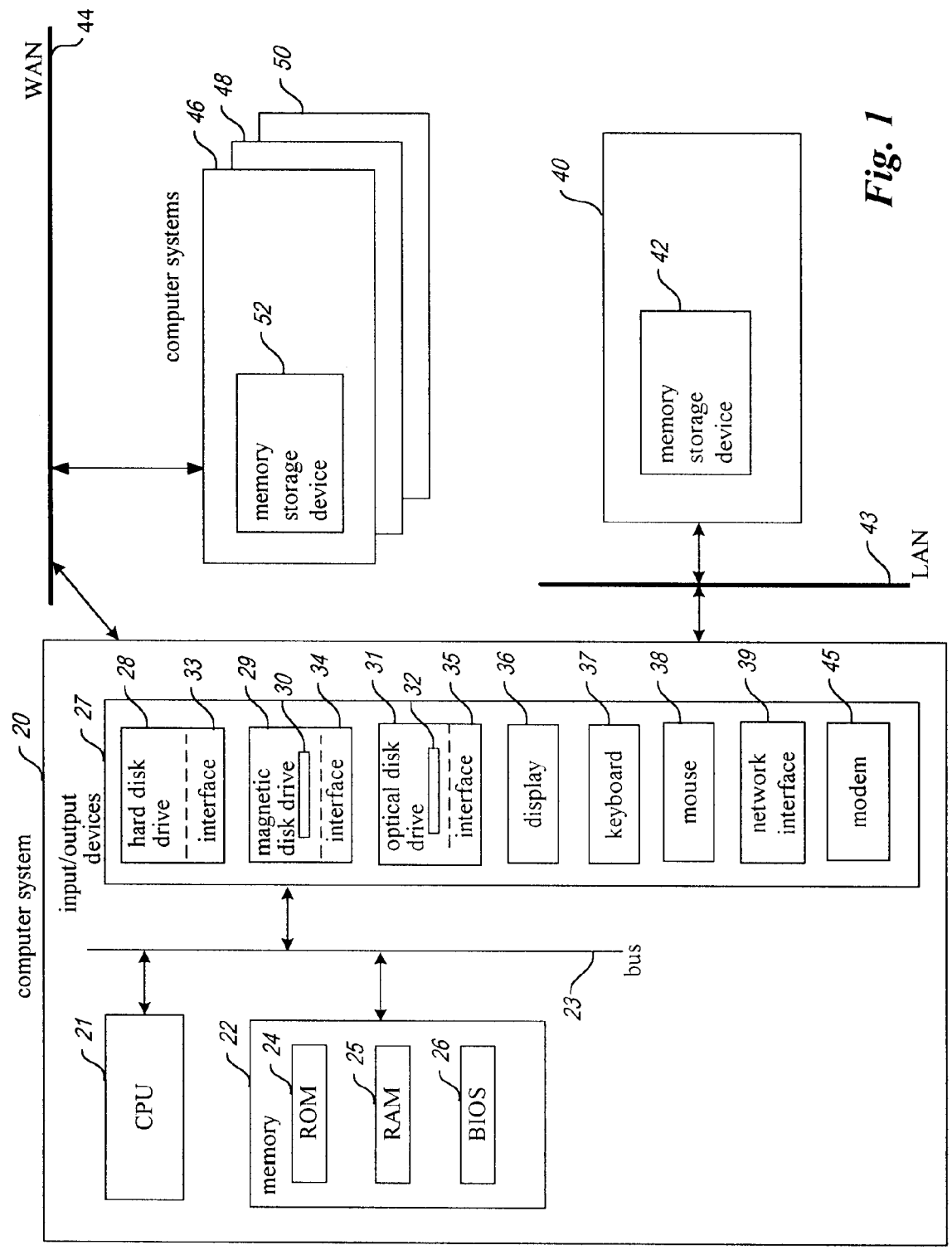
FIG. 1 illustrates a computer system that includes components to implement the system of the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output system 26 (BIOS), containing the basic routines that helps to transfer information between elements within the personal computer 20, such as during start-up, may be stored in ROM 24.

The personal computer 20 further includes input/output devices 27, such as a hard disk drive 28 for reading from and writing to a hard disk, not shown, a magnetic disk drive 29 for reading from or writing to a removable magnetic disk 30, and an optical disk drive 31 for reading from or writing to a removable optical disk 32 such as a CD ROM or other optical media. The hard disk drive 28, magnetic disk drive 29, and optical disk drive 31 are connected to the system bus 23 by a hard disk drive interface 33, a magnetic disk drive interface 34, and an optical drive interface 35, respectively. The drives and their associated computer-readable media provide nonvolatile storage of computer readable instructions, data structures, program modules and other data for the personal computer 20. Although the exemplary environment described herein employs a hard disk, a removable magnetic disk 30 and a removable optical disk 32, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment. Other I/O devices 27, such as a display 36, keyboard 37, mouse 38, and the like may be included in the personal computer 20 and function in a known manner. For the sake of brevity, other components, such as a joystick, sound board and speakers are not illustrated in FIG. 1.

The personal computer 20 may also include a network interface 39 to permit operation in a networked environment using logical connections to one or more remote computers, such as a remote computer 40. The remote computer 40 may be another personal computer, a server, a router, a network PC, a peer device or other common network node, and typically includes many or all of the elements described above relative to the personal computer 20, although only a memory storage device 42 has been illustrated in FIG. 1. The logical connections depicted in FIG. 1 include a local area network (LAN) 43 and a wide area network (WAN) 44. Such networking environments are commonplace in offices, enterprise-wide computer networks, intranets and the Internet.

When used in a LAN networking environment, the personal computer 20 is connected to the LAN 43 through the network interface 39. When used in a WAN networking environment, the personal computer 20 typically includes a modem 45 or other means for establishing communications over the wide area network 44, such as the Internet. The modem 45, which may be internal or external, permits communication with remote computers 46-50. In a networked environment, program modules depicted relative to the personal computer 20, or portions thereof, may be stored in the remote memory storage device 42 via the LAN 51 or stored in a remote memory storage device 52 via the WAN 44. It will be appreciated that the network connections shown are exemplary and other means of establishing a communications link between the computers may be used.

Figure 2:
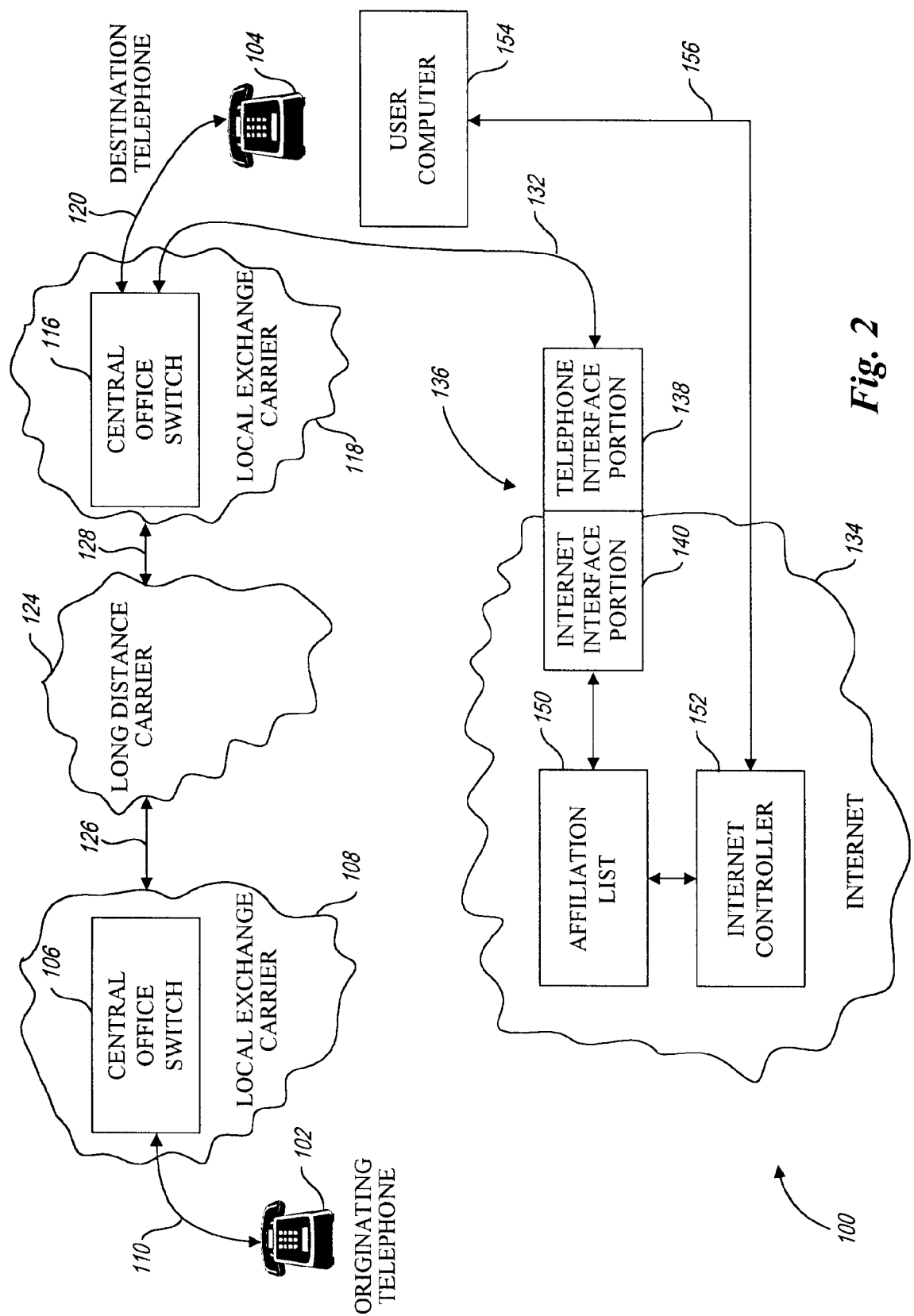
FIG. 2 is a functional block diagram outlining the operation of the present invention.

The present invention is embodied in a system 100 illustrated in the functional diagram of FIG. 2. In a typical telephone communication, an originating telephone 102 is operated by the caller to place a call to a destination telephone 104. The originating telephone generates signals that are detected by a central office switch 106 operated by a local exchange carrier (LEC) 108. The LEC 108 is the telephone service provider for the calling party. The originating telephone 102 is coupled to the central office switch 106 via a communication link 110. As those skilled in the art can appreciate, the communication link 110 may be a hard-wired connection, such as a fiber optic, copper wire, or the like.

Alternatively, the communication link 110 may be a wireless communication link if the originating phone 102 is a cellular telephone or some other form of wireless telephone.

Similarly, the destination telephone 104 is coupled to a central office switch 116 operated by a local exchange carrier (LEC) 118. The destination telephone 104 is coupled to the central office switch 116 via a communication link 120. The communication link 120 may be a hard-wired communication link or a wireless communication link, as described above with respect to the communication link 110. The present invention is not limited by the specific form of communication link or central office switch.

The LEC 108 establishes a communication link with the LEC 118. As illustrated in FIG. 2, the communication link between the LEC 108 and the LEC 118 is through a long distance carrier (LDC) 124. The LEC 108 establishes a communication link 126 with the LDC 124 which, in turn, establishes a communication link 128 with the LEC 118. If the telephone call from the originating telephone 102 to the destination telephone 104 is not a long distance call, the LDC 124 is not required. In this case, the communication link 126 may couple the LEC 108 directly to the LEC 118. The use of the system 100 with other telephone configurations are illustrated in other figures.

To place a telephone call, the caller activates the originating telephone 102 to dial in the telephone number corresponding to the destination telephone number 104, thereby establishing the communication link 110 with the central office switch 106. In turn, the central office switch 106 establishes the communication link 126 (via the LDC 124, if necessary), thus establishing a communication link with the central office switch 116. In a conventional telephone system, the central office switch 116 establishes the communication link 120 to the destination telephone 104 causing the destination telephone to ring. If the callee picks up the destination telephone, a complete communication link between the originating telephone 102 and the destination telephone 104 has been established. This is sometimes referred to as "terminating" the telephone call. The specific telecommunications protocol used to establish a telephone communication link between the originating telephone 102 and the destination telephone 104 is well known in the art and need not be described herein. The preceding description of techniques used to establish the telephone communication link are provided only as a basis for describing the additional activities performed by the system 100.

With the system 100, the central office switch 116 does not initially establish the telephone communication link 120 with the destination telephone 104 to cause the telephone to ring. Instead, the central office switch 116 establishes a communication link 132 with a computer network 134, such as the Internet. As those skilled in the art can appreciate, the Internet is a vast multi-computer network coupled together by data links having various communication speeds. Although the Internet 134 may use a variety of different communication protocols, a well-known communication protocol used by the Internet is a Transmission Control Protocol/Internet Protocol (TCP/IP). The transmission of data on the Internet 134 using the TCP/IP is known to those skilled in the art and need not be described in greater detail herein.

The central office switch 116 utilizes conventional telephone communication protocols, which may be different from the TCP/IP communication protocols used by the Internet 134. The system 100 includes a communication interface 136 to translate data between the two communication protocols. The communication interface 136 includes a telephone interface portion 138 and an Internet interface portion 140. The telephone interface portion 138 is coupled to the central office switch 116 via the communication link 132 such that communications occurring on the communication link 132 utilize the telephone communication protocol. The Internet interface portion 140 communicates via the Internet using conventional communication protocols, such as TCP/IP.

The communication interface 136 may be implemented on a computing platform that functions as a server. The conventional components of the computing platform, such as a CPU, memory, and the like are known to those skilled in the art and need not be described in greater detail herein. The telephone interface portion 138 may comprise an Integrated Services Digital Network (ISDN) Primary Rate Interface (PRI) to communicate with the central office switch 116. The ISDN PRI, which may be implemented on a plug-in computer card, provides information to the telephone interface portion 138, such as automatic number identification (ANI), dialed number identification service (DNIS), and the like. As is known, ANI provides the telephone number of the caller's telephone (e.g., the originating telephone 102) while the DNIS allows the number the caller dialed (e.g., the destination telephone 104) to be forwarded to a computer system. These data may be considered "keys" which may be used by the system 100 to identify the caller and the callee. Thus, the central office switch 116 provides information which may be used to access the affiliation list 150 for the destination telephone 104.

The Internet interface portion 140 may be conveniently implemented with a computer network card mounted in the same computing platform that includes the ISDN PRI card. However, it is not necessary for satisfactory operation of the system 100 that the interface cards be co-located in the same computing platform. It is only required that the telephone interface portion 138 communicate with the Internet interface portion 140. The Internet interface portion 140 receives the incoming data (e.g., the ANI, DNIS, and the like) and generates Internet compatible commands. The specific form of the Internet commands using, by way of example, TCP/IP, are within the scope of knowledge of one skilled in the art and need not be described herein. As will be described below, data provided by the central office switch 116 will be used to access data on the Internet and use that data to determine the manner in which a telephone call will be processed.

The Internet 134 stores an affiliation list 150, which may be established by the user of the destination telephone 104. Data stored within the affiliation list 150 is accessed by the central office switch 116 to determine the manner in which the call from the originating telephone 102 will be processed. Details of the affiliation list 150 are provided below. The Internet 134 also includes an Internet controller 152 which communicates with a callee computer 154 via a network link 156. The communication between the callee computer 154 and the Internet 134 is a conventional communication link used by millions of computers throughout the world. For example, the callee computer 154 may be a personal computer (PC) containing a communication interface, such as a modem (not shown). The network link 156 may be a simple telephone communication link using the modem to communicate with the Internet 134. The Internet controller 152 functions in a conventional manner to communicate with the callee computer 154 via the network link 156. Although the communication link 132 and the network link 156 are both communication links to the Internet, the network link 156 is a conventional computer connection established over a telephone line, a network connection, such as an Ethernet link, or the like. This conventional network link 156 is significantly different from the communication link 132 between the central office switch 116 and the Internet 134. The central office switch 116 establishes the communication link 132 to access data on the Internet and uses that accessed data to determine how to process an incoming call for the destination telephone 104. The network link 156 is a computer-to-computer connection that may simply use a telephone as the physical layer to establish the network link.

In the system 100, the central office switch 116 receives an incoming call from the originating telephone 102 via the central office switch 106 and, optionally, the LDC 124. Rather than immediately establishing the communication link 120 and generating a ring signal at the destination telephone 104, the central office switch 116 establishes the communication link 132 and communicates with the Internet 134 via the communication interface 136. The purpose of such communication is to access the affiliation list 150 and thereby determine the manner in which the user of the destination telephone 104 wishes calls to be processed.

Figure 3:
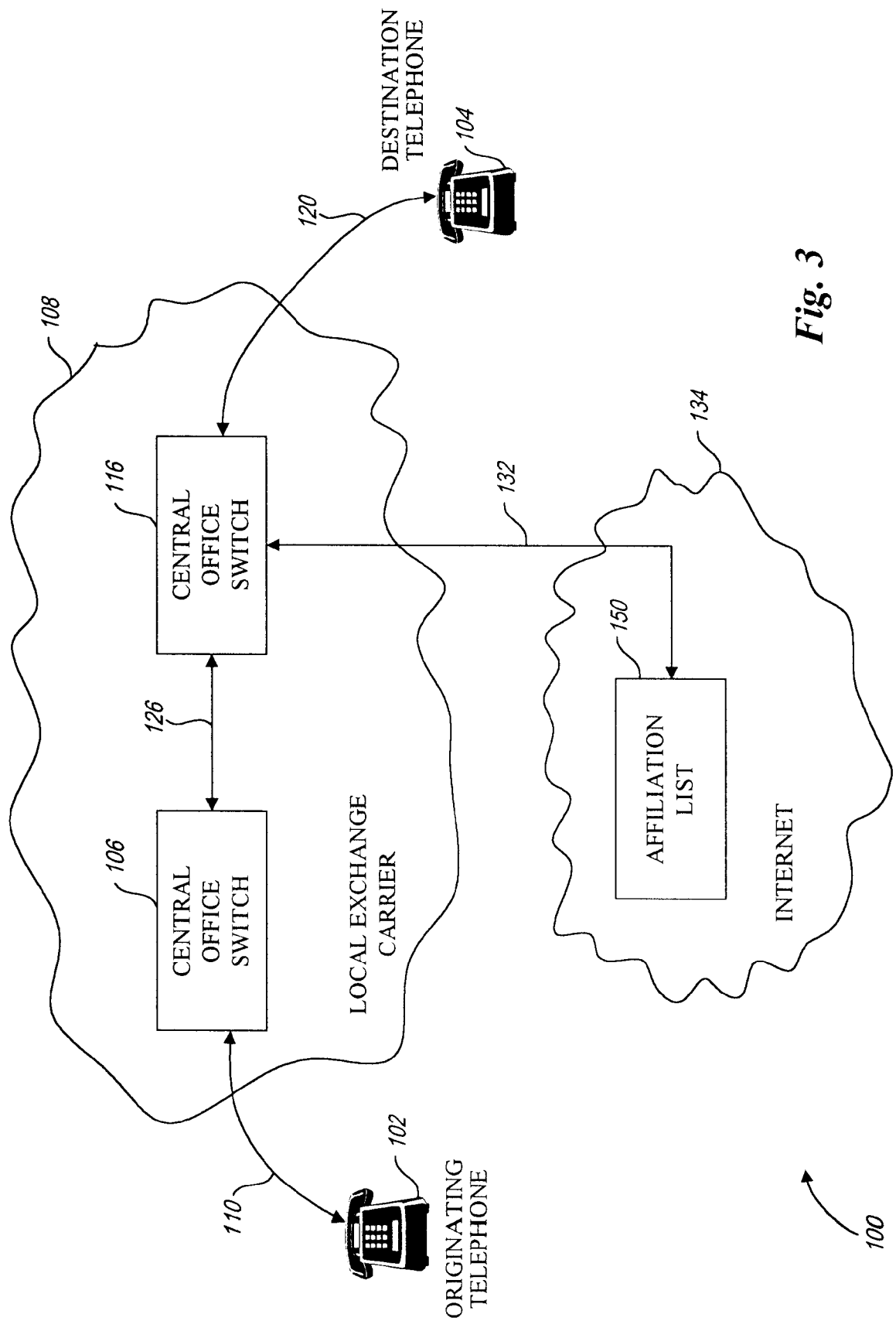
FIG. 3 is a functional block diagram of an alternate telecommunications configuration implementing the present invention.

FIG. 3 illustrates the system 100 for a telephone system configuration in which the originating telephone 102 and the destination telephone 104 are both serviced by the same local exchange carrier 108. The originating telephone 102 establishes the communication link 110 with the central office switch 106 in the manner described above. The central office switch 106 establishes the communication link 126 directly with the central office switch 116 without the need for the LDC 124 (see FIG. 2). The central office switch 116 operates in the manner described above. That is, the central office switch 116 does not immediately establish the communication link 120, but does establish the communication link 132 with the Internet 134. For the sake of simplicity, FIG. 3 does not illustrate the communication interface 136. However, those skilled in the art will appreciate that the central office switch 116 accesses the affiliation list 150 via the communication interface 136 (see FIG. 2).

For the sake of simplicity, FIG. 3 also does not show the Internet controller 152 and the callee computer 154. However, those skilled in the art can appreciate that those portions of the system may also be present in the embodiment illustrated in FIG. 3. However, it should be noted that the callee computer 154 and the Internet controller 152 need only be used to edit the affiliation list 150. The call processing by the central office switch 116 does not depend on the presence of the Internet controller 152 or the callee computer 154. That is, the central office switch 116 accesses the affiliation list 150 via the communication interface 136 regardless of the presence of the callee computer 154.

Figure 4:
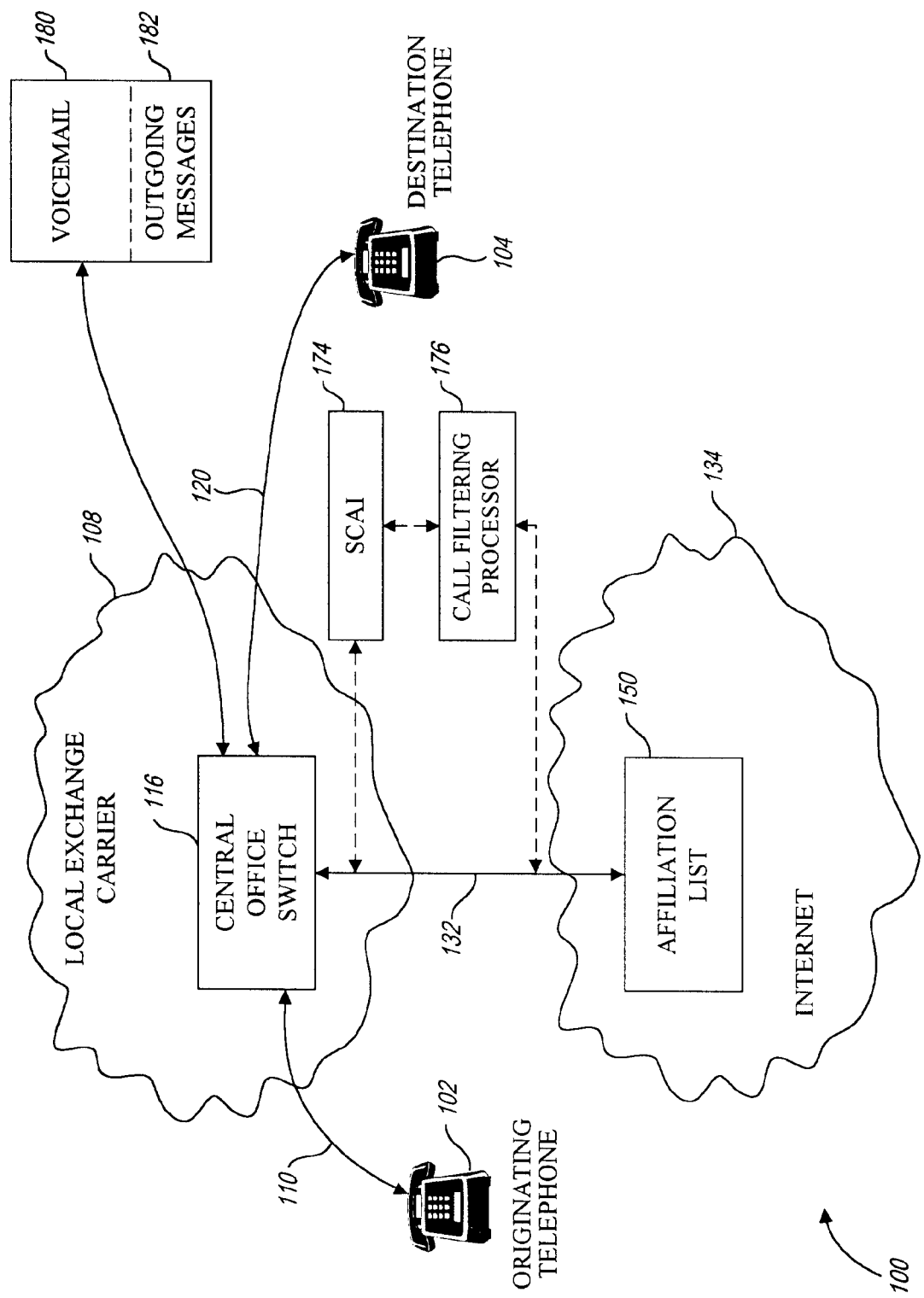
FIG. 4 is a functional block diagram of another alternative telecommunications configuration implementing the present invention.

In yet another telephone system configuration, illustrated in FIG. 4, the originating telephone 102 and the destination telephone 104 are not only serviced by the same local exchange carrier 108, but are connected to the same central office switch 116. However, the fundamental operation of the system 100 remains identical to that described above with respect to accessing the affiliation list 150. That is, the originating telephone 102 establishes the communication link 110 with the central office switch 116. However, the central office switch 106 need not establish the communication link 126 with any other central office switch since the destination telephone 104 is also connected to that same central office switch.

In this telephone system configuration, the central office switch 116 accesses the affiliation list 150 on the Internet 134 via the communication link 132 (see FIG. 2) in the manner described above. For the sake of simplicity, FIG. 4 does not illustrate the communication interface 136. However, those skilled in the art will recognize that the communication interface 136 operates to convert communication signals between telephone protocol used by the central office switch 106 and the Internet communication protocol used by the Internet 134. In addition, FIG. 4 also does not illustrate the Internet controller 152 and the callee computer 154. As noted above with respect to FIG. 3, the Internet controller 152 and callee computer 154 are not necessary for proper operation of the system 100. The callee computer 154 is typically used in the system 100 to edit the affiliation list 150.

Figure 5:
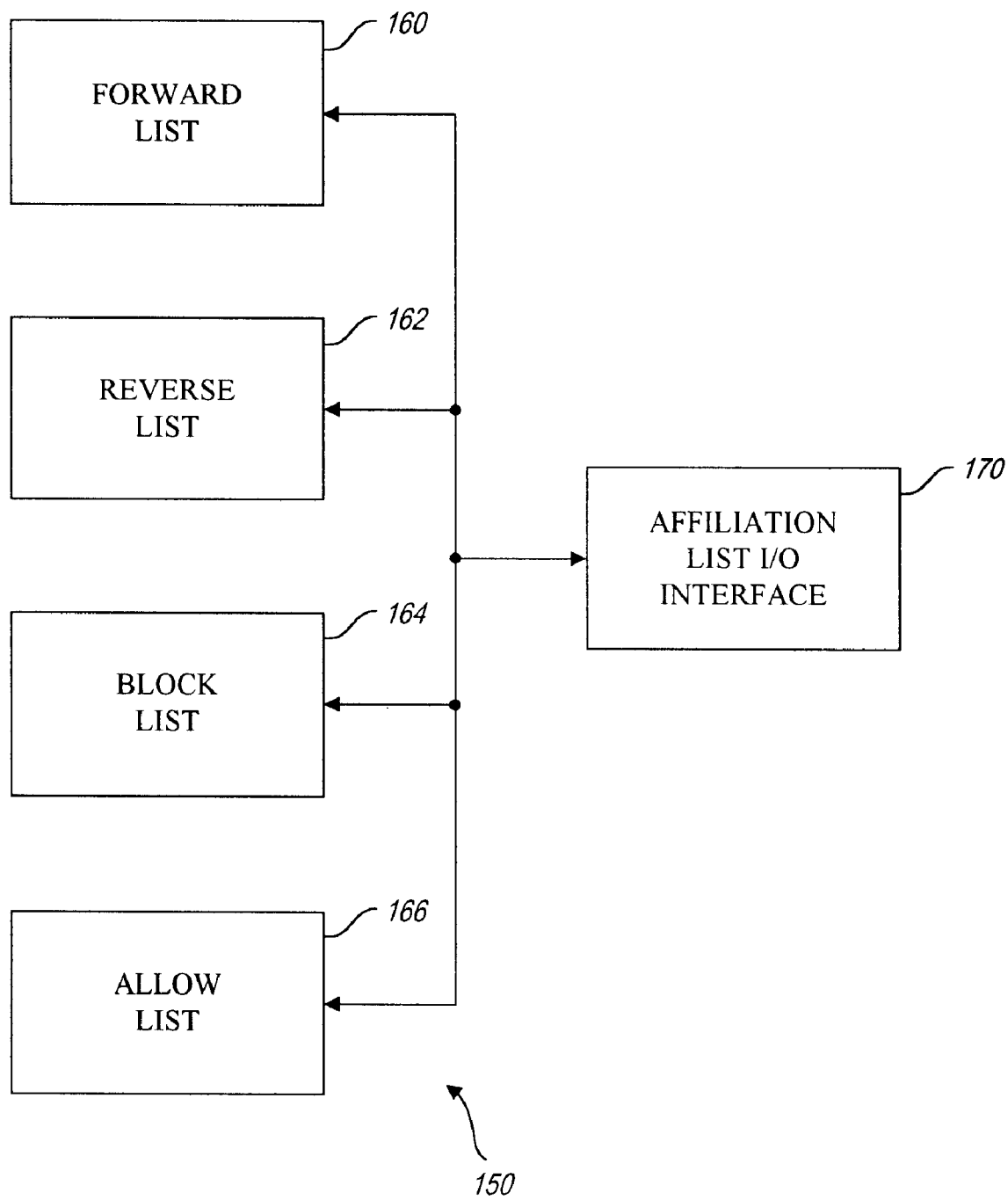
FIG. 5 is a functional block diagram providing details of the affiliation list of the system of FIG. 2.

The affiliation list 150 is illustrated in greater detail in the functional block diagram of FIG. 5. The affiliation list comprises a series of sublists, illustrated in FIG. 3 as a forward list 160, a reverse list 162, a block list 164, and an allow list 166. The forward list 160 contains a list of Internet subscribers whose Internet activity a user wishes to monitor. This list is sometimes referred to as a "buddy" list. When the user operates the callee computer 154 on the Internet 134, the Internet controller 152 accesses the forward list 160 via an affiliation list input/output (I/O) interface 170 to determine which Internet subscribers contained within the forward list are currently active on the Internet 134. In conventional Internet operation, the Internet controller 152 sends a message to the callee computer 154 indicating which Internet subscribers on the forward list 160 are currently active on the Internet 134.

The forward list 160 is a list of Internet subscribers whose activity is reported to the user. Other Internet subscribers may have their own forward list (not shown) and may monitor the Internet activity of the user. When the user accesses the Internet 134 with the callee computer 154, that activity can be monitored by others. With the system 100, it is possible to determine who is monitoring the user's Internet activity. The reverse list 162 contains a list of Internet subscribers who have placed the user in their forward list. That is, the reverse list 162 contains a list of Internet subscribers who have placed the user in their buddy list. With the reverse list 162, the user can determine who is monitoring his Internet activity.

The block list 164 contains a list of Internet subscribers that the user does not want to monitor his Internet activity. That is, the user's Internet activity will not be provided to any Internet subscriber contained in the block list 164. Thus, even if a particular Internet subscriber has placed the user on their forward list, the presence of that particular Internet subscriber's name on the block list 164 will prevent the user's Internet activity from being reported to the particular Internet subscriber. The use of the block list 164 provides certain security assurances to the user that their Internet activity is not being monitored by any undesirable Internet subscribers.

The allow list 166 contains a list of Internet subscribers for whom the user may wish to communicate with but whose Internet activity the user does not wish to monitor.

The system 100 combines the capabilities of the affiliation list 150 with telephone switching technology to filter incoming calls to the destination telephone 104. For example, the user may specify that only calls from Internet subscribers contained in the forward list 154 may contact the user via the destination telephone 104. Alternatively, the user may specify that a calling party whose name is contained in the forward list 160 or the allow list 166 may place a call to the destination telephone 104. As will be discussed in greater detail below, the system 100 allows the user to create general conditional processing, such as blocking calls or allowing calls. However, the user can also create specific conditional processing for individual callers or based on the user's current status or preferences.

The central office switch 116 accesses the affiliation list 150 via the communication link 132 and determines whether the calling party is in a list (e.g., the forward list 160) that the user wishes to communicate with. If the calling party is contained within an "approved" list, the central office switch 116 establishes the communication link 120 and sends a ring signal to the destination telephone 104. Thus, the user can pick up the telephone with the knowledge that the calling party is an individual with whom the user wishes to communicate.

Conversely, if the calling party is not contained within an approved list, such as the forward list 160 or the allow list 166, the central office switch 116 will not establish the communication link 120 with the destination telephone 104. Thus, the user will not be bothered by undesirable phone calls. In one embodiment, the central switch office simply will not establish the communication link 120 and the calling party will recognize that the call did not go through. Alternatively, the central office switch 116 may generate a signal indicating that the destination telephone 104 is busy. In this alternative embodiment, the calling party will receive a busy signal on the originating telephone 102. Thus, the user has the ability to filter incoming calls by creating a list of those individuals with whom the user wishes to communicate.

It should be noted that the affiliation list 150 may be dynamically altered by the user to add or delete individuals, change individuals from one list to another, or to change the call processing options for a particular list depending on the user's preferences. For example, the user may want to accept all calls from any source at certain times of the day. Under these circumstances, the user can edit the allow list 166 to accept calls from any calling party. Alternatively, the user may still maintain the block list 164 such that calls will not be processed from certain specified parties even if the user is willing to accept calls from any other source. Under other circumstances, the user may not wish to communicate with any individuals. In this instance, the user may indicate that all calling parties are on the block list 164. Thus, the central office switch 116 will access the Internet 134 in real-time and review data in the affiliation list 150 to thereby process incoming calls for the user in accordance with the rules present in the affiliation list.

The discussion above provides examples of the central office switch 116 processing calls from a calling party in accordance with their presence or absence of certain lists in the affiliation list 150. For example, a call from a party on the forward list 160 will be connected to the destination telephone 104 (see FIG. 2) while a call from a party on the block list 164 will not be put through to the destination telephone. However, the system 100 also allows the selection of call processing options on an individual basis rather than simply on the presence or absence in a particular list. For example, the user can edit the allow list 166 to specify that certain individuals are "allowed" while other individuals may be allowed, conditionally allowed, or blocked all together. If the individual calling party has an associated status indicating that they are allowed, the central office switch 116 will process the incoming call and connect it to the destination telephone 104. If the individual calling party has an associated blocked status, the central office switch 116 will not process the call and will not connect it to the destination telephone 104.

Furthermore, the user may attach conditional status to individual callers or to calling lists. Conditional status may be based on factors, such as the time of day, current availability of the user, work status, or the like. For example, the user may accept calls from certain work parties during specified periods of the day (e.g., 9:00 a.m.–11:00 a.m.), block calls from selected calling parties during other periods of time (e.g., 12:00–1:00 p.m.), or allow calls during a business meeting only from certain calling parties (e.g., the boss). These conditional status criteria may be applied to individuals or to one or more lists in the affiliation list 150.

FIG. 6 illustrates sample data entries in the allow list 166. The allow list 166 may include data, such as a name, Internet subscriber name, and one or more phone numbers associated with the individual data entry. It should be noted that the calling party need not have an Internet subscriber name for proper operation of the system 100. That is, the central office switch 116 accesses the allow list 166 utilizing the calling party number and need not rely on any email addresses or other Internet subscriber identification for proper operation. The allow list 166 may also include an email alias in addition to or in place of the Internet subscriber name. Some Internet subscribers prefer to "chat" with other subscribers utilizing an alias rather than their actual Internet subscriber name. The data of FIG. 6 illustrates one possible embodiment for the allow list 166. However, those skilled in the art can appreciate that the allow list 166 may typically be a part of a large database (not shown). Database operation is well known in the art, and need not be described in greater detail herein. The database or other form of the forward list 160 may be satisfactorily implemented using any known data structure for storage of data. For example, the various lists (e.g., the allow list 166, the reverse list 162, the block list 164 and the allow list 166) may all be integrated within a single database structure. The present invention is not limited by the specific structure of the affiliation list 150 nor by the form or format of data contained therein.

Rather than incoming call filtering on the basis of presence in a particular list, such as the allow list 166, as illustrated in FIG. 6, the affiliation list 150 may contain status data on an individual basis. In this event, the central office switch 116 (see FIG. 2) processes the incoming call in accordance with the designated status for that individual. In the example illustrated in FIG. 7, the affiliation list 150 contains one individual with an "allowed" status, one individual with a "blocked" status, and one individual with a "conditional" status based on user-selected criteria. In the example of FIG. 7, the user-selected criteria may be based on the particular phone from which the call is originating as well as the time of day in which the call is originated. For example, the user may wish to allow all calls from a particular number, such as an caller's work number. However, calls from another number, such as the caller's home phone, may be blocked. Other calls, such as from a caller's cellular telephone, may be allowed only at certain times of day. FIG. 7 is intended to illustrate some of the call processing options that are available to the user. As can be appreciated, a variety of different conditional status criteria may be applied to one or more potential calling parties. However, a common feature of the system 100 is that the telecommunication system. (e.g., the central office switch 116) determines calling pat status on the basis of information stored on the Internet and processes the incoming call in accordance with the user-specified criteria. Moreover, the system 100 operates in real-time to process the incoming call in accordance with the user-specified criteria.

The Internet 134 may be conveniently used as a storage area for the caller specified criteria. The advantage of such data storage on the Internet is that the data is widely accessible to the user. This provides a convenient mechanism for entering new caller data or editing existing caller data. The user can access the affiliation list 150 with the callee computer 154 via the network link 156. In contrast, the central office switch 116 may access the affiliation list 150 via the communication link 132, which may typically be a high-speed communication link. In addition, FIGS. 2, 4, and 5 illustrate the central office switch 116 as the telecommunication component that accesses the Internet 134. It is convenient for operational efficiency to have the central office switch (e.g., the central office switch 116) to which the destination telephone 104 is connected perform such Internet access. It is at this stage of the telephone call processing that the telecommunication system may most conveniently determine the user-specified caller status. However, those skilled in the art will recognize that the status check may be performed by other portions of the telecommunication system, such as the central office switch 106, the LDC 124, or the like. Thus, the present invention is not limited by the particular telecommunication component that establishes the communication link with a network which the user-specified caller status data is stored.

In addition, the system 100 can be readily implemented as an "add-on" component of the telecommunication system and need not be integrated with the central office switch 116. For example, the conventional central office switch provides the ability to divert calls based on certain call conditions, such as "Call Forward No Answer," which may be used to divert an incoming call to voicemail or "Call Forward Busy," which may also divert the incoming call to voicemail. To implement the system 100 with an add-on processor, the system may optionally include a Switch to Computer Applications Interface (SCAI) 174 and a call processor 176. The dashed lines of FIG. 4 are intended to illustrate an alternative configuration of the system 100. This alternative configuration can also be implemented with other telephone system configurations, such as illustrated in FIGS. 2 and 3. The SCAI 174 is a telecommunication protocol that allows switches to communicate with external computers. Data, such as caller and callee telephone numbers, and status information, such as Call Forward Busy, are provided to the SCAM 174 by the central office switch 116.

The call processor 176 performs the functions described above to process the call in accordance with the user-specified criteria. That is, the call processor 176 receives caller and callee data from the SCAI 174 and accesses the affiliation list 150 via the communication interface 136 (see FIG. 2). The call processor 176 uses user-specified call processing criteria to generate instructions for the central office switch 116. The instructions are provided to the central office switch 116 via the SCAI 174. Those skilled in the art will appreciate that the SCAI 174 is but one example of the Open Application Interface (OAI) that can be used with the central office switch 116.

As noted above, the system 100 can process a call intended for the destination telephone 104, block a call, or generate a busy signal at the originating telephone 102. However, the system 100 also operates with voicemail and permits a number of different customized outgoing messages. FIG. 4 illustrates a voicemail system 180 having a storage area containing one or more outgoing messages 182. For example, the voicemail system 180 can play an outgoing message 182 informing the caller that "the party you are calling only accepts calls from designated callers. Please leave a message." If calls are blocked only at certain times, the outgoing message 182 can say "the party you are calling does not accept calls between 11:30 a.m. and 1:00 p.m. Please leave a message or call back after 1:00 p.m." The outgoing message can also reflect callee availability by playing a message such as "The party you are calling is in a meeting. Please leave a message or call back in X minutes" where X reflects the amount of time before the meeting is expected to end. That information can be manually provided to the affiliation list 150 by the user or automatically derived from a computerized scheduling program on, by way of example, the callee computer 154 (see FIG. 2).

Computerized scheduling programs, such as Microsoft® D Schedule Plus, can be used on the callee computer 154 (see FIG. 2). It is known that such scheduling programs can be accessed via a computer network or downloaded to a hand-held computing device to track appointments. The system 100 can access such computerized scheduling programs and download appointments and scheduled meetings into the affiliation list 150. The outgoing messages 182 can be automatically selected on the basis of the user's computerized schedule. Thus, the system 100 permits the user to schedule his day (e.g., meetings, lunch time, in office/available for calls, in office/unavailable for calls, etc.) on a computerized scheduling program and to process calls in accordance with the computerized schedule and even select outgoing messages automatically based on the user's schedule.

The operation of the system 100 is illustrated in the flowchart of FIG. 7. At a start 200, the calling party has placed a call from the originating telephone 102 (see FIG. 2) to the destination telephone 104. In step 202, the central office switch 116 has received call data from the originating telephone 102. The received call data includes the destination telephone number of the destination telephone 104 and identification data indicating the originating telephone 102 as the source of the present call. Use of automatic number identification (ANI) is a well-known technique for providing identification data indicating the originating telephone 102 as the source of the present call. While the specific implementation of ANI data, sometimes referred to as caller ID, may not be uniformly implemented throughout the United States, the ANI data is typically delivered between the first and second rings. In the present invention, the central office switch 116 (see FIG. 2) does not initiate a ring signal to the destination telephone 104 until after determining the status of the calling party based on the ANI. In future implementations, telecommunication companies may transmit other forms of caller identification, such as caller name, Internet address, email alias, or the like. The system 100 operates satisfactorily with any form of caller identification. The only requirement for the system 100 is that some form of caller identification be provided. The call is processed in accordance with the user-specified criteria in the affiliation list 150 for the identified caller.

In step 204, the central office switch 116 (see FIG. 2) establishes the communication link 132 with the Internet 134. Although step 204 illustrates the system 100 as actively establishing the communication link 132 with the Internet 134, those skilled in the art will recognize that the system 100 can utilize a continuous high-speed data link between the central office switch and the Internet. Thus, it is not necessary to establish a network link for each and every incoming call processed by the central office switch 116. As previously described, the communication interface 136 translates data between the telephone protocol and the Internet protocol. In step 206, the system 100 accesses the affiliation list 150 for the user (i.e., the called party). In an exemplary embodiment, the telephone number of the destination telephone 104 or other callee identification is used as an index or pointer to a specific location within the database where the affiliation list 150 for the particular user may be found. Database operation in general, and techniques for locating specific items within a database in particular are known to those skilled in the art and need not be described herein.

In decision 210, the system 100 determines whether the caller identification data is on the forward list 160 (see FIG. 3). If the caller identification data is present in the forward list, the result of the decision 210 is YES. In that event, the system 100 proceeds to FIG. 6B where the call is processed in accordance with the rules associated with the forward list 160.

If the caller identification data is not present in the forward list 160 (see FIG. 3), the result of decision 210 is NO. In that event, the system 100 moves to decision 212 to determine whether the caller identification data is in the allow list 166. If the caller identification data is present in the allow list 166, the result of decision 214 is YES. In that event, the system 100 proceeds to decision 216 where the call is processed in accordance with the rules associated with the allow list 166. If the caller identification data is not present in the allow list 166, the result of decision 216 is NO.

Figure 8:
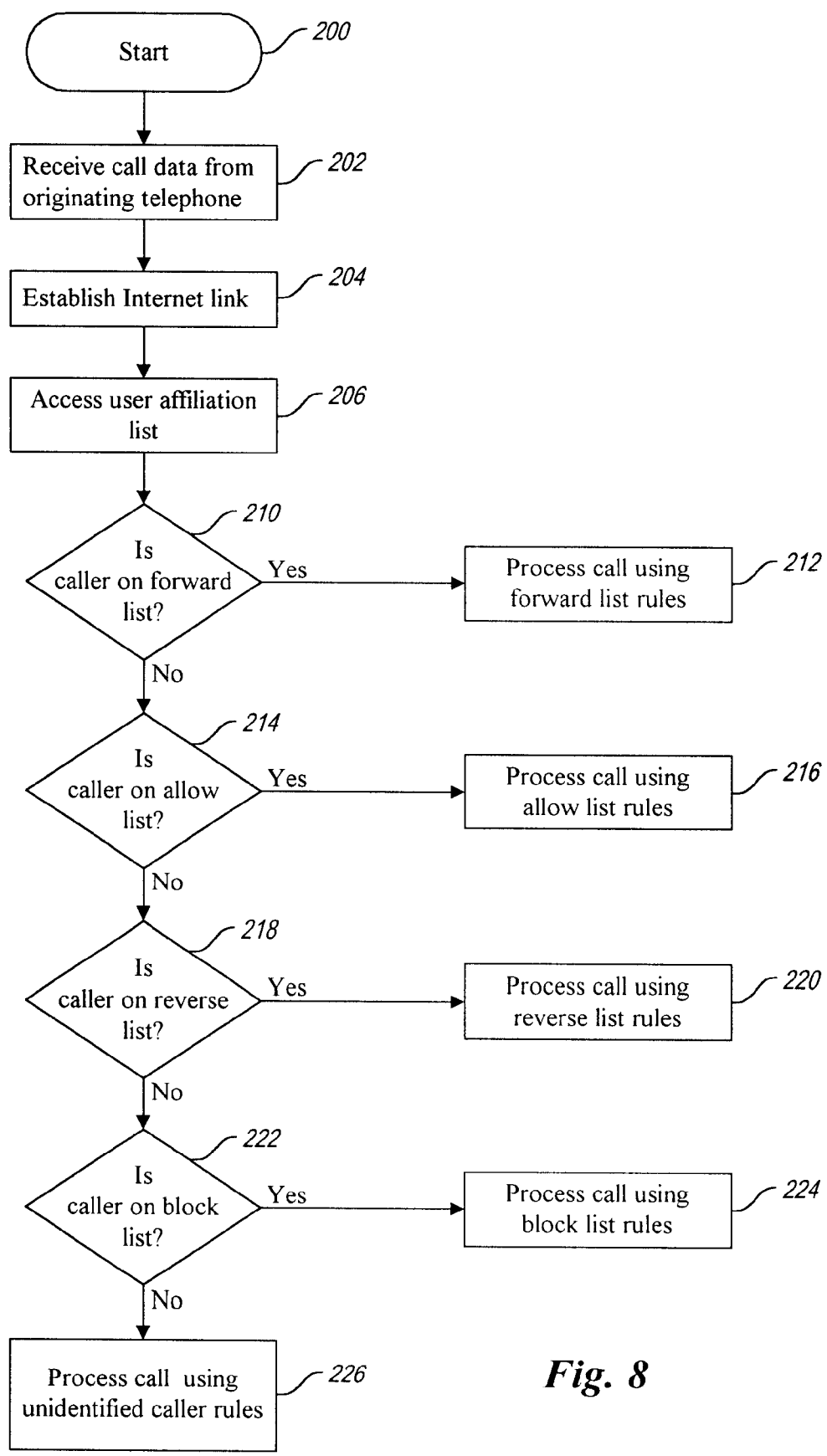
FIG. 8 is a flowchart illustrating the operation of the system of FIG. 2.

In decision 218, the system 100 determines whether the caller identification data is present in the reverse list 162. If the caller identification data is present in the reverse list 162, the system 100 proceeds to the step 220 where the call is processed in accordance with the rules associated with the reverse list 162. If the caller identification data is not present in the reverse list, the result of decision 218 is NO. In that event, the system moves to decision 216 to determine whether the caller is present on the block list 164. If the caller is present on the block list 164, the result of decision 222 is YES. In that event, the system proceeds to step 224 where the call is processed in accordance with the rules associated with the block list. If the caller identification data is not present in the block list 164, the result of decision 222 is NO. This indicates that the caller identification data is not present in any of the user-specified lists in the affiliation list 150. In that event, the system moves to step 226 where the call may be processed in accordance with user-specified rules of processing anonymous or unidentified calls. The flowchart of FIG. 8 illustrates the operation of the system 100 with multiple lists wherein the call processing rules are designated for each list. In this embodiment, the call is processed on the basis of the presence or absence of the caller identification data in a particular list. However, as previously discussed, the affiliation list 150 (see FIG. 5B) may include user-specified status criteria for individual callers. In this embodiment, the system 100 processes the call on the basis of the user-specified status criteria associated with the individual caller rather than on the basis of the caller's presence or absence in a specific list. In that event, the system 100 may simply access the user affiliation list (see step 206 in FIG. 7) and process the call in accordance with the user-specified status criteria for the individual caller. If the caller identification data is not present in the affiliation list 160, the call may be processed using user-specified call processing criteria for unidentified callers, as shown in step 226.

Thus, the system 100 allows the user to specify call processing rules for a plurality of different caller lists or for individual callers within a list. The caller lists may be readily edited in accordance with the changing desires of the user. The user may alter the call processing rules in accordance with various times of day, work conditions, or even the personal mood of the user. For example, the user may process all calls during certain times of the day, such as when the user is at work. However, when the user arrives home, subsequent calls may be processed in accordance with a different set of rules, such as accepting no calls during dinner time or after a certain time at night.

These rules may be applied differentially to different ones of the list in the affiliation list 150. For example, the user may accept calls from any calling party on the forward list 160 (see FIG. 3) or the allow list 166 during the evening hours. However, after a certain time at night, the caller may accept calls only from calling parties on the forward list 160. Thus, the system 100 allows great flexibility in the user selection of calling rules and lists. The system 100 allows the user to filter incoming calls in accordance with generalized rules or in accordance with highly specific rules.

Figure 9:
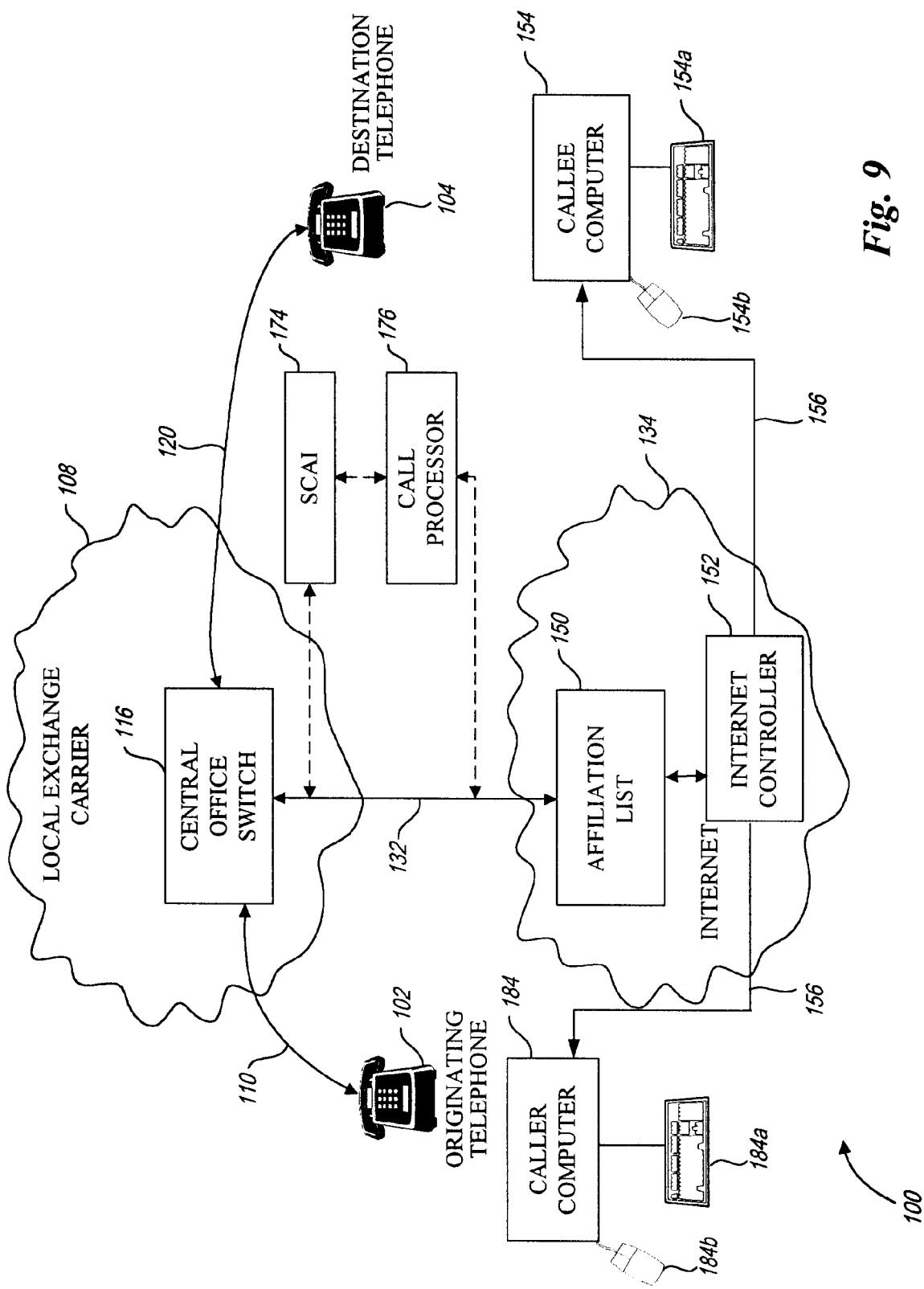
FIG. 9 is a functional block diagram illustrating the system of the present invention to process a call in accordance with both a caller and callee call processing criteria.

In addition to filtering incoming calls to the destination telephone 104, the system 100 can monitor the status or activity of both the caller and the callee and establish a communication link between the originating telephone 102 and the destination telephone 104 when the status data indicates that both the caller and callee are available for a telephone conversation. The system 100 has been previously described with respect to callee status monitoring and processing of incoming calls in accordance with the user-selected (i.e., the callee-selected) call processing criteria. Similar status monitoring can be performed for the caller. As illustrated in FIG. 9, the system 100 may include a caller computer 184, which is coupled to the Internet via the communication link 132. For the sake of clarity, FIG. 9 illustrates the callee computer 154 and the caller computer 184 as connected to the Internet 134 through a single Internet controller 152. However, those skilled in the art will appreciate that the Internet 134, or any computer network, includes many network controllers that function as a gateway to the network. Thus, the system 100 typically includes a large number of Internet controllers 152.

In addition, for the sake of clarity, Figure illustrates only a single affiliation list 150. However, those skilled in the art will appreciate that separate affiliation lists exist for the originating telephone 102 and the destination telephone 104. The central office switch 116 (or the call processor 176) access the appropriate affiliation list via the network connection 132 and apply the appropriate call processing rules for each telephone.

FIG. 9 also illustrates a keyboard 154a and mouse 154b coupled to the callee computer 154 for use in a conventional fashion. Similarly, the caller computer 184 includes a keyboard 184a and a mouse 184b. The computer operating system, such as the Windows® operating system, is capable of monitoring user activity on the computer. For example, the operating system on the callee computer 154 can detect user activity on the keyboard 154a or the mouse 154b. By monitoring this activity, the operating system can determine the user's status and activate certain software programs, such as a screen saver, when no user activity has been detected for a certain period of time. Under these circumstances, the operating system may determine that the callee computer 154 has entered an "idle" state. Similarly, operating system on the caller computer 184 may perform similar functions to determine user activity on the caller computer. Using the principles of the present invention, the callee computer 154 and the caller computer 184 may report the current status to the affiliation list 150 for each respective computer.

The system 100 can monitor computer activity and generate signals to both the originating telephone 102 and the destination telephone 104 when the callee computer 154 and the caller computer 184 are not in the idle state. The fact that both computers' are not in the idle state indicates that the users of each respective computer may be available for a telephone conversation. In addition, the system 100 can apply call processing rules that may also govern operation of the telephone portion of the system 100. For example, the callee computer 154 may be in an "active" state (as opposed to the idle state) but the user has indicated that he should not be disturbed at the present time. Thus, the central office switch 116 or the call processor 176 accesses the affiliation list 150 for the destination telephone 104 to determine the callee-selected call processing criteria. In addition, the central office switch 116 or the call processor 176 can access the affiliation list 150 for the caller and apply any caller-selected call processing rules. For example, the caller computer 184 may be in the active state, but the caller status in the affiliation list 150 may indicate that the caller is in a meeting and is, therefore, unavailable for a telephone call with the callee. In this manner, the system 100 can monitor computer activity and determine when the caller and callee may both be available for a telephone call and further applies call processing criteria for both the caller and callee. The call processing criteria for the caller and callee as well as the current status of the callee computer 154 and the caller computer 184 are stored within the respective affiliation lists 150 on the Internet 134. This data may be accessed by the central office switch 116 or the call processor 176 via the network connection 132 in the manner previously described.

In operation, the system allows a caller to indicate a desire to establish a telephone communication link with a specified callee. The caller can use the originating telephone 102 or the caller computer 184 to initiate the call processing by the system 100. The system 100 monitors the caller and callee activities and call processing rules and, when appropriate for both parties, establishes a telephone communication link by sending signals from the central office switch 116 to the originating telephone to generate a ring signal. The central office switch 116 also generates appropriate signals to generate ring signal at the destination telephone 104.

As can be appreciated, the originating telephone 102 communicates with the central office switch 116 using the communication link 110 while the caller computer 184 communicates with the Internet 134 using the communication link 132. The communication link 132 may be a second telephone line, a network connection, such as an Ethernet connection, or the like. If the user has two telephone lines, the telephone number of the telephone (e.g., the destination telephone 104) can be different from the telephone number associated with the computer (e.g., the callee computer 154). However, the system 100 must be aware of an association between the telephone and the computer. This is particularly important if the status of the computer (i.e., idle or active) is used as one of the call processing criteria. The system 100 can monitor the activity of a computer (e.g., the callee computer 154) in order to establish a telephone communication link with an associated telephone (e.g., the destination telephone 104). It is of no value to monitor a user's computer status at one location and call a completely unrelated telephone at a different location. For example, it is of no value to monitor the callee's computer at work and then to call the callee's home telephone number.

In other implementations, such as with a home computer, only a single telephone line may serve the function of both the communication link 110 and the communication link 132. Under these circumstances, the caller may use the caller computer 184 to indicate a desire to establish the telephone communication link and then must terminate the communication link 132 so that the central office switch may generate the appropriate signals on the communication link 110 at a point in time when the callee call processing criteria and the caller call processing criteria are both met. It should be further noted that this implementation will preclude the use of the status (i.e., idle or active) of the caller computer 184 since the communication link 132 is not active.

Similarly, the destination telephone 104 and the callee computer 154 may be connected to the central office switch 116 and the Internet 134 via separate communication links (i.e., the communication link 120 and the communication link 132, respectively). However, the system 100 may also be implemented with a single phone line. The callee may use the callee computer 154 and the communication link 132 to generate or edit the callee call processing criteria in the affiliation list 150. However, the user must then terminate the communication link 132 to permit the central office switch 116 to establish the communication link 120. As noted above, a single phone line precludes the use of computer status monitoring (i.e., idle or active) for the callee computer 154 since the status cannot be monitored via the communication link 132.

Figure 10:
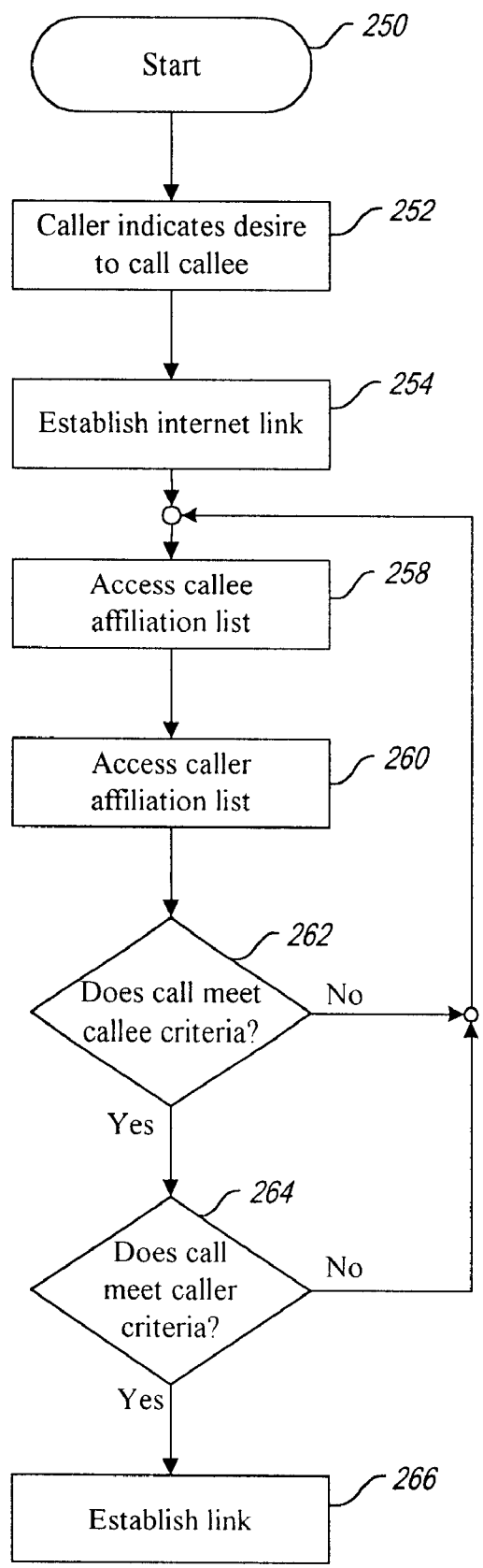
FIG. 10 is a flowchart illustrating the operation of the system of FIG. 9.

The operation of the system 100 to establish a communication link with both the originating telephone 102 and the destination telephone 104 is illustrated in the flowchart of FIG. 10 where, at a start 250, it is assumed that the caller and callee both have data in their respective affiliation lists. As previously noted, the affiliation list 150 for each individual may comprise separate sublists, such as illustrated in FIG. 5, or a single data structure containing call processing criteria, such as allowing or blocking individual calls (see FIG. 7) or establishing conditional criteria, such as time restrictions, current user status (e.g., in a meeting), or the current status of the user's computer (e.g., the idle or active status of the callee computer 154). Furthermore, as previously noted, user status can be automatically provided to the affiliation list 150 by a computerized schedule program.

In step 252, the caller indicates a desire to establish a telephone communication link with the callee. In a conventional communication system, the caller picks up the originating telephone and dials the telephone number for the destination telephone 104. However, in accordance with this aspect of the system 100, the caller may indicate the desire to establish a telecommunication link using the caller computer 184 and placing the callee telephone number (i.e., the telephone number of the destination telephone 104) on a call list, such as the forward list 160 (see FIG. 5). By placing the callee on the forward list, the system 100 can access the callee affiliation list to determine whether the callee computer 154 is active on the Internet.

With the callee telephone number (i.e., the telephone number of the destination telephone 102) placed on the call list, the system 100 can determine the call processing criteria of both the caller and the callee, and process the request for a telephone call in accordance with those rules. In step 254, the system 100 establishes a communication link with the Internet 134. As previously noted, the central office switch 116 may directly establish the communication link 132 with the Internet 134 or may use the SCAI 174 and call processor 176 to communicate with the Internet. It should be noted that the telephone portion of the system may have a continuous data link with the Internet via the central office switch 116 or the call processor 176. Thus, it is not necessary to continuously establish and tear down the communication link 132.

In step 258, the system 100 accesses the callee affiliation list 150. In step 260, the system 100 accesses the caller affiliation list 150. As previously noted, the physical location of each affiliation list in unimportant to the satisfactory operation of the system. The only requirement is that the affiliation list is accessible via the computer network, such as the Internet 134.

In decision 262, the system 100 applies the callee call processing criteria and determines whether the present calling conditions meet the callee criteria. This includes testing whether the caller is contained within one of the sublists illustrated in FIG. 5 or if the status associated with the call origination data indicates that the caller is allowed or blocked, or the like. If the present calling conditions do not meet the callee criteria, the result of decision 262 is NO. In that event, the system 100 can return to step 258 to again access the callee affiliation list. As those skilled in the art can appreciate, the callee affiliation list may be updated by the callee (typically via the callee computer 154) which may change the result of decision 262.

If the current call does meet the callee call processing criteria, the result of decision 262 is YES. In that event, the system 100 uses the data from the caller affiliation list 150 to determine whether the present call meets the caller call processing criteria. Although the caller indicated a desire to establish a telephone link with the callee, the caller may not be available for an immediate phone call. For example, the caller may have a meeting scheduled to begin, but expects to be available for a phone call following the meeting. The caller can manually set the call processing criteria, such as indicating the desired time of the telephone call. Alternatively, the caller call processing criteria may be automatically supplied to the caller affiliation list 150 through the use of a computerized scheduling program or the like. The system 100 may also monitor the status of the caller computer 184 to determine caller availability. For example, the caller may indicate an availability for a phone call after a predetermined time. The system 100 can detect the change in the state of the caller computer 184 from the idle state to the active state and interpret that as an indication that the caller is now available for a telephone call. The system can apply these conditions individually or in various combinations to determine the availability of the caller and callee. If the call does not meet the caller call processing criteria, the result of decision 264 is NO. In that event, the system 100 can return to step 258 to access the affiliation lists for the callee and caller, respectively, and thus continuously monitor the callee and caller call processing criteria to determine an appropriate time to make a phone call.

If the call does meet the caller call processing criteria, the result of decision 264 is YES. In that event, in step 266 the system 100 causes the central office switch 116 to send the appropriate ring signals to the originating telephone 102 and ring signals to the destination telephone 104. In this manner, the telephone system follows the call processing guidelines of both caller and callee stored on a computer network to control the processing of the call on the telephone network.

Although the example illustrated in FIG. 10 illustrates a continuous process of checking call processing criteria against the current call conditions, those skilled in the art appreciate that other possible actions can be taken by the system 100. For example, the caller may be on the block list 164 (see FIG. 5). In this condition, the call will never meet the callee call processing criteria. The system 100 thus will never establish a communication link. The system 100 can send a message to the caller computer 184 indicating that the callee does not accept calls in this manner and to leave a message on the voicemail system 180. Alternatively, the system 100 can establish a telephone communication link to the originating telephone 102 and provide a similar message. As discussed above with respect to FIG. 4, a variety of voice mail messages can be provided to the user. The system 100 may establish a telephone communication link to the originating telephone 102 and play the appropriate outgoing message 182 (see FIG. 4). As noted above, the system 100 can apply call processing rules derived from any source, such as the current status (e.g., idle or active) of the callee computer 154 or the caller computer 184, the presence or absence on one of the sublists in FIG. 5 (e.g., the block list 164), the status of one party (e.g., the allowed status of the caller), callee or caller status data provided by computerized scheduling systems, or the like. The system 100 advantageously allows multiple forms of call processing criteria to be stored in the network, such as the Internet 134, and accessed by the telephone system, such as the central office switch 116 or the call processor 176. Those skilled in the art will also recognize that the embodiment of the system 100 shown in FIG. 9 can be implemented with various telephone system configurations, such as those illustrated in FIGS. 2 and 3, or any other telephone system configuration. Furthermore, the system 100 is not limited by the specific component of the telephone system that establishes the network link 132 with the affiliation list 150. Although FIG. 9 illustrates the central office switch 116 or the call processor 176 as the component that establishes the network link, those skilled in the art will recognize that other components, such as the central office switch 106 (see FIG. 2), the LDC 124, or the like can establish the network link 132. Thus, the system 100 is not limited by the specific component of the telephone communication system that establishes the network link 132.

From the foregoing it will be appreciated that, although specific embodiments of the invention have been described herein for purposes of illustration, various modifications may be made without deviating from the spirit and scope of the invention. For example, the system discussed herein uses, by way of example, the Internet 134 to store the affiliation list 150. However, the system 100 can be implemented with other computer networks or as a portion of a telephone switch, such as the central office switch 116. The telephone service provider can provide a customer with an affiliation list and some means to control the list as a value-added telephone service. The central office switch 116 accesses the internal affiliation list and processes the incoming calls in accordance with the user-specified criteria contained therein. Accordingly, the invention is not limited except as by the appended claims.

What is claimed is:

1. In a system that includes a telephone network and a computer network with one or more users, wherein each user is connected through a user computer the computer network and is logically connected through the computer network to the telephone network, a method of determining when to establish telephone communication between two parties, at least one of whom is a user connected to said computer network, comprising:

at the computer network, receiving information from the telephone network that a first party from whom a call is originating desires to establish telephone communication with a second party;

at the computer network, monitoring activity of a user computer connected to the computer network and associated with the second party;

at the computer network, storing a set of pre-determined rules for determining when the second party is available to take a call from the first party;

at the computer network, using the set of a pre-determined rules to process i) the information received from the telephone network regarding the call being originated by the first party, and ii) information regarding the monitored activity of the user computer of the second party, to determine when the second party is available to take the call originated by the first party; and using the information processed at the computer network to facilitate connecting the call originated by the first party through the telephone network to the second party.

2. A method as recited in claim 1, further comprising, at the computer network, monitor activity of a user computer connected to the computer network and associated with the first party, wherein using the set of pre-determined rules is also performed using information regarding the monitored activity of the user computer of the first party.

3. A method as recited in claim 1, wherein using the information processed at the computer network to facilitate connecting the call comprises sending control signals to the telephone network to cause the telephone network to connect the call.

4. A method as recited in claim 1, wherein the predetermined rules are associated with an affiliation list of the second party and wherein the first party is referenced by the buddy list.

5. A method as recited in claim 1, wherein monitoring activity of a user computer connected to the computer network and associated with the second party comprises monitoring activity of an input device of the user computer.

6. A method as recited in claim 1, wherein the pre-defined rules specify whether the second party accepts telephone calls from the first party.

7. In a system that includes a telephone network and a computer network with one or more users, and wherein each user is connected through a user computer to the computer network and is logically connected through the computer network to the telephone network, a computer program product comprising:
    a computer readable medium for carrying computer executable instructions for implementing at the computer network a method of determining when to establish. telephone communication between two parties, at least one of whom is a user connected to said computer network, and wherein said method comprises:
        at the computer network, receiving information from the telephone network that a first party from whom a call is originating desires to establish telephone communication with a second party;
        at the computer network, monitoring activity of a user computer connected to the computer network and associated with the second party;
        at the computer network, storing a set of predetermined rules for determining when the second party is available to take a call from the first party; and
        at the computer network, using the set of predetermined rules to process i) the information received from the telephone network regarding the call being originated by the first party, and ii) information regarding the monitored activity of the user computer of the second party, to determine when the second party is available to take the call originated by the first party.

8. A computer program product as recited in claim 7, wherein the method further comprises using the information processed at the computer network to facilitate connecting the call originated by the first party through the telephone network to the second party.

9. A computer program product as recited in claim 7, wherein the pre-determined rules specify whether the second party accepts telephone calls from the first party.

10. A computer program product as recited in claim 7, wherein the pre-determined rules define how the telephone call is to be processed based on the time of the day of the telephone call.

11. A computer program product as recited in claim 7, wherein the method further comprises, at the computer network, monitoring activity of a user computer connected to the computer network and associated with the first party, wherein using the set of pre-determined rules is also performed using information regarding the monitored activity of the user computer of the first party.

12. In a system that includes a telephone network and a computer network with one or more users, and wherein each user is connected through a user computer to the computer network and is logically connected through the computer network to the telephone network, a method of determining when to establish telephone communication between two parties, each of whom is a user connected to said computer network, comprising:
    at the computer network, monitoring activity of the user computers associated with both a first and a second party;
    at the computer network, receiving information from the telephone network that the first party is originating a call to the second party;
    at the computer network, storing a set of pre-determined rules for determining when the second party is available to take a call from the first party;
    at the computer network, using the set of pre-determined rules to process i) the information received from the telephone network regarding the call being originated by the first party, and ii) information regarding the monitored activity of the user computers of the first and second parties, to determine when the second party is available to take the call originated by the first party; and
    using the information processed at the computer network to facilitate connecting the call originated by the first party through the telephone network to the second party.

13. A method as recited in claim 12, wherein using the information processed at the computer network to facilitate connecting the call comprises sending control signals to the telephone network to cause the telephone network to connect the call.

14. A method as recited in claim 12, wherein the pre-determined rules are associated with an affiliation list of the second party and wherein the first party is referenced by the buddy list.

15. A method as recited in claim 12, wherein monitoring activity of a user computer connected to the computer network and associated with the second party comprises monitoring activity of an input device of the user computer associated with the second party.

16. A method as recited in claim 12, wherein the pre-defined rules specify whether the second party accepts telephone calls from the first party.

17. In a system that includes a telephone network and a computer network with one or more users, and wherein each user is connected through a user computer to the computer network and is logically connected through the computer network to the telephone network, a computer program product comprising:
    a computer readable medium for carrying computer executable instructions for implementing at the computer network a method of determining when to establish telephone communication between two parties, each of whom is a user connected to said computer network, wherein said method comprises:
        at the computer network, monitoring activity of the user computers associated with both the first and second parties;
        at the computer network, receiving information from the telephone network that the first party is originating a call to the second party;
        at the computer network, storing a set of pre-determined rules for determining when the second party is available to take a call from the first party; and at the computer network, using the set of pre-determined rules to process i) the information received from the telephone network regarding the call being originated by the first party, and ii) information regarding the monitored activity of the user computers of the first and second parties, to determine when the second party is available to take the call originated by the first party.

18. A computer program product as recited in claim 17, wherein the method further comprises using the information processed at the computer network to facilitate connecting the call originated by the first party through the telephone network to the second party.

19. A computer program product as recited in claim 17, wherein the pre-determined rules specify whether the second party accepts telephone calls from the first party.

20. A computer program product as recited in claim 17, wherein the pre-determined rules define how the telephone call is to be processed based on the time of the day of the telephone call.

* * * * *